US00H002133H

(19) United States
(12) Statutory Invention Registration
Sorathia

(10) Reg. No.: US H2133 H
(43) Published: Nov. 1, 2005

(54) FIREPROOF PROTECTION INTEGRATING FABRICATION SYSTEM FOR COMPOSITE STRUCTURES

(75) Inventor: Usman A. K. Sorathia, Arnold, MD (US)

(73) Assignee: The United States of America as represented by the Secretary of the Navy, Washington, DC (US)

(21) Appl. No.: 09/822,308

(22) Filed: Mar. 29, 2001

(51) Int. Cl.[7] ..... B32B 9/04; B05B 1/36

(52) U.S. Cl. ..... 428/447; 428/297.4; 428/304.4; 428/311.11; 428/428; 428/429; 428/448; 427/402; 427/407

(58) Field of Search ..... 428/447, 448, 428/428, 429, 297.4, 304.4, 311.11; 427/402, 407.1

(56) References Cited

U.S. PATENT DOCUMENTS 5,270,105 A 12/1993 Conroy et al.
2001/0031350 A1 * 10/2001 Day et al. ..... 428/317.9

OTHER PUBLICATIONS

Publication entitled "Fire Protection of Glass/Vinyl Ester Composites for Structural Applications" by U. Sorathia and C. Beck for 41st Internation SAMPE Symposium dated 24–28, 1996 pp. 687–697.

* cited by examiner

*Primary Examiner*—Aileen Felton
(74) *Attorney, Agent, or Firm*—Jacob Shuster

(57) ABSTRACT

A composite structure having a substrate is protectively covered during fabrication by a barrier layer, such as an intumescent mat or felt, into which a fire resisting agent such as phenolic resin or water, or oil based intumescent coating is infused in-situ before attachment to the substrate and completion of composite structure fabrication. The barrier layer is infused in-situ with the phenolic resin before attachment by adhesive bonding to the substrate or infusion is performed during formation of the underlying substrate layer so as to achieve attachment without adhesive.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIREPROOF PROTECTION INTEGRATING FABRICATION SYSTEM FOR COMPOSITE STRUCTURES

The present invention relates generally to fabrication of composite structures in such a manner as to endow it with protective properties.

BACKGROUND OF THE INVENTION

Composite structures having a substrate made of a structural material such as glass/vinyl ester are presently utilized for shipboard use. Because of flammability concerns in regard to such structures, passive fire protection has been proposed involving attachment of insulation blankets by means of self tapping screws. Installation of such fire protection for composite structures is both labor intensive and costly, especially in Naval shipboard types of seawater environments. It is therefore an important object of the present invention to provide less costly and less labor intensive fire protection for the foregoing referred to types of composite structures.

SUMMARY OF THE INVENTION

In accordance with the present invention, during fabrication of a composite structure having a solid substrate made of a preferred shipboard material such as glass/vinyl ester or a sandwich type substrate, a protective barrier layer is applied to such substrate with a fire resisting agent such as phenolic resin, water or an oil-based intumescent coating. According to certain embodiments, the barrier layer in its position or place is permeated or infused in situ with the phenolic resin before attachment by adhesive bonding to the substrate. According to other embodiments, the substrate is formed at the same time the barrier layer is infused with the phenolic resin so that it attaches the barrier layer to the substrate without use of adhesive.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
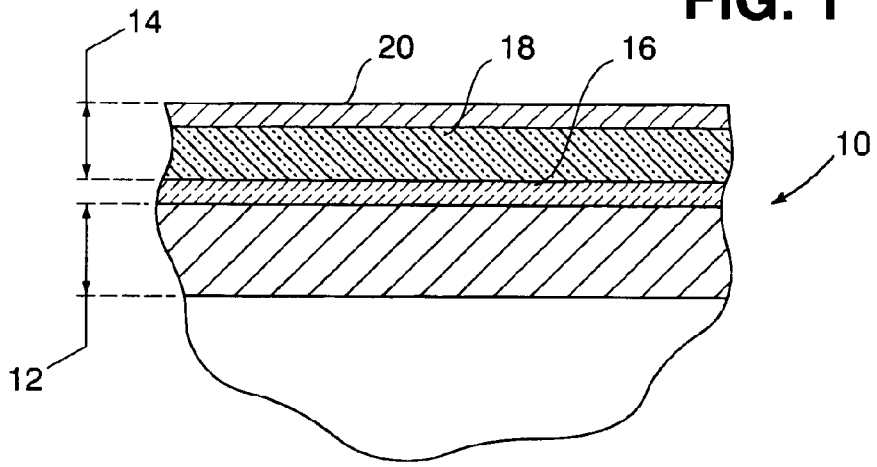
FIG. 1 is a partial section view through a composite structure with which the present invention is associated in accordance with certain embodiments.

Referring now to the drawing in detail, FIG. 1 illustrates a composite structure 10 which is to be utilized for example on a Navy marine vessel. Such composite structure 10 includes a substrate 12 that is solid as shown, made of a structural material such as glass/vinyl ester preferred for shipboard use. A fire protective barrier layer 14 is attached to the substrate 12 by a suitable bonding adhesive 16, such as a phenolic or silicone adhesive.

With continued reference to FIG. 1, the barrier layer 14 includes a core 18 formed by an intumescent mat or felt, protectively covered by a water proofing skin 20 such as an aluminum foil. A fire resisting agent is introduced into such barrier 14 before its adhesive bonding attachment to the substrate 12. Such fire resisting agent is either phenolic resin or water, or an oil-based intumescent coating infused into the mat core 18.

As an alternative, the barrier layer 14 may be formed from other materials into which the fire resisting agent, such as the phenolic resin, is introduced in-situ by scrimping so as to provide protection from damage from fire and high temperature conditions during normal use of the composite structure, as well as to resist water and solvent damage.

Figure 2:
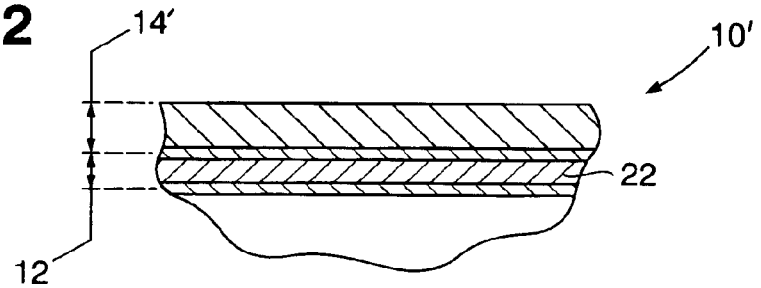
FIG. 2 is a partial section view of a composite structure in accordance with other embodiments.

FIG. 2 illustrates a composite structure 10' fabricated in accordance with other embodiments of the present invention. Such composite structure 10' includes a substrate 12' of a composite type having a core 22 made of balsawood or foam. A fireproof barrier layer 14' protectively covers the substrate 12', made of an intumescent mat into which phenolic resin is infused in-situ during fabrication or formation of the underlying substrate 12' so as to be attached thereto without use of the bonding adhesive 16.

Figure 3:
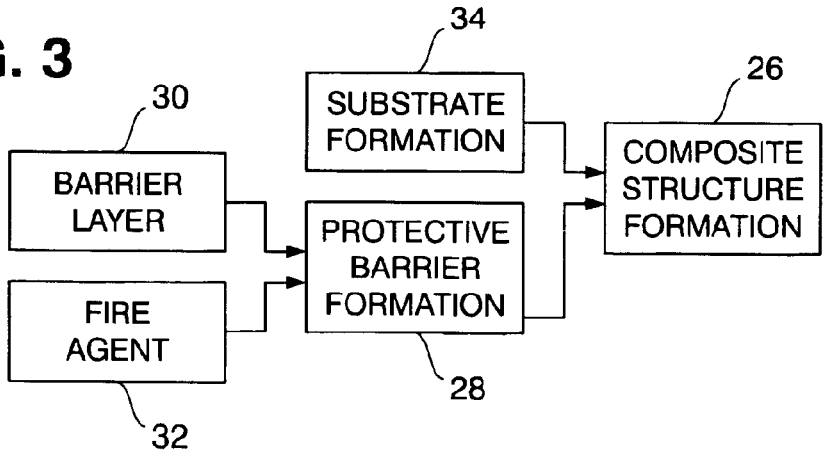
FIG. 3 is a block diagram of the procedure associated with fabrication of the composite structures illustrated in FIGS. 1 and 2, so as to provide it with damage preventing protection from fire under shipboard use.

It will be apparent from the foregoing description, that the protective barrier layer 14 or 14' covers either a solid type substrate 12 or a composite core type substrate 12' and that the fire resisting agent is introduced in-situ, for example by infusion of the phenolic agent, either before attachment of the barrier layer by bonding adhesive 16 or during formation of the substrate to avoid use of such bonding adhesive for attachment purposes. FIG. 3 diagrammatically summarizes the procedures involved, resulting in formation 26 of a fireproof panel pursuant to the present invention. Such procedures include formation 28 of the protective barrier from a barrier layer 30, such as the barrier layers 14 or 14', into which the fire resisting agent 32 is introduced, either before adhesive bonding to the substrate or during its formation 34 to avoid use of the adhesive bonding, before completing formation 26 of the composite structure as diagrammed in FIG. 3.

Obviously, other modifications and variations of the present invention may be possible in light of the foregoing teachings. It is therefore to be understood that within the scope of the appended claims the invention may be practiced otherwise than as specifically described.

What is claimed is:

1. In a process for protective fabrication of a composite structure to be exposed to seawater environments, the improvement residing in a sequence of steps including: a) forming a barrier; b) introducing a fire resisting agent into the barrier after said forming thereof: c) forming a substrate; and d) attaching the barrier to the substrate in underlying relation thereto before completing the fabrication of the composite structure; wherein said introducing of the fire resisting agent comprises: infusion into the barrier.

2. In a process for protective fabrication of a composite structure to be exposed to seawater environments, the improvement residing in a sequence of steps including: a) forming a barrier, b) introducing a fire resisting agent into the barrier after said forming thereof: c) forming a substrate; and d) attaching the barrier to the substrate in underlying relation thereto before completing the fabrication of the composite structure; wherein said attaching of the barrier to the substrate is performed by providing an adhesive between the barrier and the substrate.

3. In a process for protective fabrication of a composite structure to be exposed to seawater environments, the improvement residing in a sequence of steps including: a) forming a barrier; b) introducing a fire resisting agent into the barrier after said forming thereof: c) forming a substrate; and d) attaching the barrier to the substrate in underlying relation thereto before completing the fabrication of the composite structure; wherein said introducing of the fire resisting agent is performed by infusion thereof into the barrier during said forming of the substrate to effect said attaching of the barrier to the substrate without using an adhesive.

* * * * *